March 1, 1966    A. H. KAZAKEVICIUS    3,238,474
FOUR-PORT HYBRID TRANSFORMER CIRCUIT PROVIDING
ACCURATE SUM AND DIFFERENCE OUTPUTS
Filed Jan. 28, 1963    7 Sheets-Sheet 1

INVENTOR.
ALGIMANTAS H. KAZAKEVICIUS
BY
Sidney Magnes
AGENT.

March 1, 1966 A. H. KAZAKEVICIUS 3,238,474
FOUR-PORT HYBRID TRANSFORMER CIRCUIT PROVIDING
ACCURATE SUM AND DIFFERENCE OUTPUTS
Filed Jan. 28, 1963 7 Sheets-Sheet 2

INVENTOR.
ALGIMANTAS H. KAZAKEVICIUS
BY
Sidney Magner
AGENT

INVENTOR.
ALGIMANTAS H. KAZAKEVICIUS

INVENTOR.
ALGIMANTAS H. KAZAKEVICIUS
BY Sidney Magnell
AGENT

INVENTOR.
ALGIMANTAS H. KAZAKEVICIUS
BY
*Sidney Magnes*
AGENT

United States Patent Office 3,238,474
Patented Mar. 1, 1966

3,238,474
FOUR-PORT HYBRID TRANSFORMER CIRCUIT PROVIDING ACCURATE SUM AND DIFFERENCE OUTPUTS
Algimantas H. Kazakevicius, Fullerton, Calif., assignor to North American Aviation, Inc.
Filed Jan. 28, 1963, Ser. No. 254,061
2 Claims. (Cl. 333—11)

This invention relates to a transformer; and more particularly to a transformer that is capable of receiving one or more separate input signals, converting them to specific output signals, and then—if desired—combining the output signals in a predetermined manner.

Background

It is often necessary to convert one or more input signals into two or more identical output signals, which are then combined in accordance with specific requirements.

As a simplified illustration of the desirability of identical output signals, consider the example of a master television receiving antenna whose output is being applied to a number of different television receivers. If the output signals from the antenna were not identical, some of the television receivers would produce pictures that were lighter or darker, or clearer or fuzzier than the pictures produced by other receivers. If the television program happened to be in color, the pictures that some television receivers produced would be bluer, redder, or greener than the pictures produced by other television receivers.

Of course, in the above example, lack of uniformity of the pictures produced by the various receivers is relatively unimportant; but in actual application, such lack of uniformity could be serious.

For example, in one type of the so-called "monopulse" radar systems, a single pulse of radar energy is transmitted toward a target. The "echo" radar energy reflected from the target is received by two suitably-oriented receiving antennas. When the separate echo signals from the two separate antennas are added together, their sum is used to indicate the distance to the target; and when the separate echo signals from the two separate receiving antennas are subtracted from each other, their difference is used to indicate whether the target is straight ahead, i.e., on-axis, or off to one side of the antenna boresight axis—and to also indicate how far off-axis, and in which direction.

As an illustration, if the target were dead-ahead (on-axis), the two receiving antennas would receive exactly the same echo signals; and when these identical echo signals are subtracted from each other, the difference would be "zero"; thus indicating that the target was exactly dead-ahead. If, however, these echo signals were not properly subtracted from each other, the difference, instead of being "zero," would have some small, but finite, value; and would thus indicate, erroneously, that the target was slightly off to one side.

It will be realized that erroneous sum and difference information of the above type could easily lead an airplane onto the wrong path, or could nullify the effectiveness of a collision-preventing system.

In a conventional monopulse radar system employing pulse signals in the 8,900 megacycle region, mixers and local oscillators are used to reduce the frequency of the received signal to a lower, so-called IF frequency. In this way, conventional IF strips or IF amplifiers may be used to amplify and transport the received signals for further processing such as additively or subtractively combining the several received signals of a monopulse receiver to obtain sum and difference signals.

Presently, signals up to a frequency of about 8 or 9 megacycles per second are handled satisfactorily by units known as "hybrid coils"; of which the Bell Telephone Laboratories is a foremost designer. At higher frequencies in the spectrum, signals having frequencies above 300 megacycles per second are generally handled by units such as "rat-races," and "microwave guides," which resemble metallic pipes having specific configurations, sizes, dimensions, and cross-sections; and which tend to be relatively large, heavy, unwieldy, and inflexible. However, the frequency range between 9 megacycles and 300 megacycles is one where no really satisfactory devices are available for producing sum and difference output signals.

It is well-known that higher frequency signals such as in the 30 to 60 megacycle region similarly lend themselves to IF signal processing techniques, and further, that improved signal-to-noise ratios are inherent in such higher frequency regions above 8 to 9 megacycles. But because no satisfactory devices exist for producing sum and difference signals in the 30 to 60 megacycle region, bulky microwave rat-races must be interposed between the receiving antenna and the IF mixer stages to achieve such sum and difference microwave signals, and subsequently the sum and difference signals are reduced to IF signals for further processing.

Objects and drawings

It is therefore the principal object of the invention to provide an improved transformer that will precisely transform input signals into output signals that may be automatically combined, compared, added together, and subtracted from each other; the improved transformer being inherently capable of being designed to handle signals of substantially any desired frequency in the VHF (very high frequency) range.

The attainment of this object and others will be realized from the following specification, taken in conjunction with the drawings of which FIG. 1 shows a prior-art transformer;

Introduction

Figure 1:
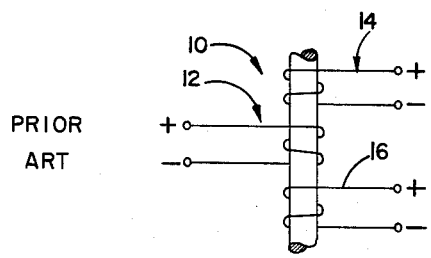

It has been found that the conversion of input signals to suitable output signals is frequently best accomplished by use of a transformer; and an exemplar prior-art transformer for accomplishing this result is shown in FIG. 1.

Here transformer 10 comprises a core upon which is wound an input winding 12, a first output winding 14, and a second output winding 16. In the illustrated transformer each winding has exactly the same number of turns, so that the output windings should produce output signals whose amplitudes are equal to each other, and equal to the amplitude of the input signal. It is one of the inherent advantages of the transformer that by changing the number of turns of the windings, the amplitudes of the output signals may be readily controlled.

Assume that in transformer 10 the instantaneous polarities of the input and output signals are shown by the plus and minus signs. A study of the windings of transformer 10 will show that the negative lead-wire of the first output winding 14 is adjacent the positive lead-wire of input winding 12; whereas the corresponding negative lead-wire of the second output winding 16 is remote from both lead-wires of input winding 12.

Similarly the positive lead-wire of the second output winding 16 is adjacent the negative lead-wire of input winding 12; whereas the corresponding positive lead-wire of the first output winding 14 is remote from both lead-wires of input winding 12.

This unsymmetrical spacing of the lead-wires of the output windings introduces an electric characteristic known as an "electrostatic field"; which in this case is unsymmetrical. Moreover, in the output windings themselves, there is a non-symmetry between the positions of the positive and negative leads of these windings themselves, relative to the leads of the input windings and to the core.

The previously-mentioned electrostatic field gives rise to a property known as electric "capacitance," which has the characteristic that it permits electricity to leak through the capacitance from one wire to another; and this leakage becomes larger as the frequency of the signals is increased.

Thus, if the input signal applied to transformer 10 were of a low frequency, the leakage due to the capacitance would be small, and the magnitude of the output signals from the separate output windings would tend to be identical. However as the frequency of the input signal increased, the leakage through the non-symmetrical electrostatic field becomes larger; and the non-symmetrical leakage produces a discrepancy between the output signals from the two windings. As the frequency of the input signal increases even more, the discrepancy due to the non-symmetrical capacitive leakage becomes even larger; and the discrepancy between the output signals becomes prohibitive.

A transformer of the above type is called "unbalanced," because of the discrepancies between its output signals, particularly at high frequencies; and it is this high-frequency discrepancy between the output signals which is important to overcome.

It may be surmised from FIG. 1 that in order to reduce the unbalance, certain windings could be reversed, repositioned, or reoriented, so that the relative positions of certain lead-wires could be changed.

For example, if output winding 16 were changed so that its positive lead-wire was at the bottom while its negative lead-wire was at the top, it might appear that this would be a more symmetrical arrangement. However, should this be done, the negative lead-wire of output winding 14 would still be adjacent the positive lead-wire of input winding 12; whereas the negative lead-wire of the now-reversed output winding 16 would be adjacent the negative lead-wire of input winding 12.

It is therefore readily seen that such rearrangement, in correcting a particular asymmetry, introduces other non-symmetries, or unbalances, between other lead-wires; and fails to correct the overall non-symmetry and unbalance of the transformer.

Many such rearrangements have been tried, but each one of them suffered from some form of non-symmetry; and therefore under various conditions, particularly those involving the use of high-frequency signals, introduced various discrepancies of the type previously discussed.

It is interesting to note that in prior-art transformers the signals had an unbalance value of −20 decibels; whereas, as will be shown in the following discussion, the disclosed transformer produces signals having a much smaller unbalance, ranging from −60 to −80 decibels—an improvement of between 100 and 1,000 to 1. For clarity, the signals from the disclosed transformer will be called "highly-balanced," to distinguish them from the so-called "balanced" signals produced by prior-art devices.

Since, at the present time, signals of progressively higher frequencies are being used, a transformer is particularly desirable for producing highly-balanced signals, particularly highly-balanced sum and difference signals, for any given frequency in a wide spectrum of VHF frequencies.

*Synopsis*

Consider a transformer that accepts two input signals; and produces a first output signal that is the sum of the two input signals, and produces a second output signal that is the difference of the two input signals. A transformer of this type is known as a "four-port" transformer; perhaps because the overall transformer is enclosed in a sealed box that has four holes, or "ports," for the acceptance of connectors or wires that handle the four different signals.

The basic concept of the invention contemplates a four-port sum and difference output signal transformer that may be used in substantially any portion of the VHF spectrum. The ports are paired, and if the first pair of ports is used as the input, then the second pair of ports produces the sum and difference output signals, there being no "crosstalk" or undesired interaction, between the input signals.

Furthermore, if desired, a third input signal may be introduced in such a way that it combines with one of the other input signals. The uncombined "unitary" first input signal and the combined "composite" second input signal may then be combined to produce the previously described sum and difference signals.

Conversely, if the second pair of ports is used as the input, then the first pair of ports produces output signals that indicate a relation between the input signals.

Basically, the inventive concept uses a plurality of sub-windings and a plurality of sub-transformers that are interconnected in such a manner as to produce substantial symmetry and balance at all times; so that the overall transformer produces highly-balanced sum and difference output signals over the widest possible range of frequencies.

*Description*

Figure 2:
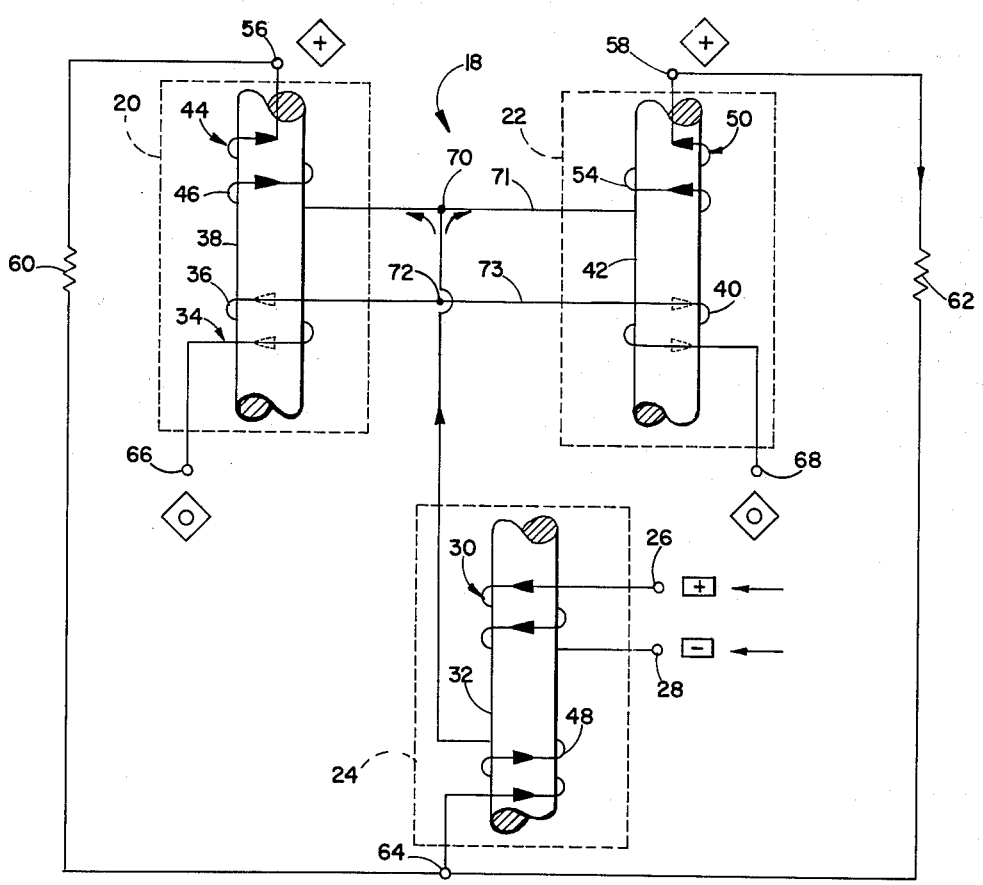
FIGS. 2 to 4 show a first embodiment of the disclosed transformer with different input signals.

The basic inventive concept will be understood from FIG. 2, which shows a novel transformer embodying the teachings of the invention.

The overall transformer 18 comprises three sub-transformers; 20, 22, and 24, each comprising a form or a core having suitable windings or sub-windings thereon. The core may comprise a material suitable for transformer construction; or it may comprise a hollow tube that merely serves as a base for the windings.

Sub-transformer 24 comprises a first complete winding 30 mounted on a suitable form or core 32. Sub-transformer 24 also comprises a sub-winding 48, whose interconnections will be discussed later.

Sub-transformer 20 comprises a second winding 34, which has one of its sub-windings 36 on second core 38, and has another of its sub-windings 40 on a third core 42—which core forms the basis for sub-transformer 22. Sub-transformer 20 also comprises a third, composite winding 44, which comprises a first sub-winding 46 mounted on second core 38, and the previously-mentioned sub-winding 48 mounted on the first core 32.

Sub-transformer 22 comprises a fourth, composite winding 50, which comprises a sub-winding 54 positioned on the third core 42, and the previously-mentioned sub-winding 48 positioned on the first core 32.

The second winding 34 may be considered to be a "split-winding," since it has sub-windings 36 and 40 positioned on different cores. Similarly composite winding 44 may also be considered as a split-winding, since it has sub-windings 46 and 48 that are positioned on different cores. In a similar manner composite winding 50 may also be considered to be a split-winding, since it has sub-windings 54 and 48 that are positioned on separate cores.

Example I

The operation of the invention may be understood by studying the effects of a single input signal applied to terminals 26 and 28 of winding 30 (in FIG. 2), these input terminals forming one of the previously-discussed "ports." The input signal is assumed to have the instantaneous polarity indicated by the plus and minus signs enclosed in the squares adjacent terminals 26 and 28.

The direction of input signal current-flow is indicated by the arrows associated with winding 30, and produces a magnetic field in core 32; this magnetic field inducing into sub-winding 48 a current-flow in the direction indicated by its associated arrows. The current from sub-winding 48 follows the path indicated by the arrows, and splits at point 70. Separate parts of the current then traverse sub-windings 46 and 54, and reach terminals 56 and 58. From the terminals 56 and 58 the currents flow through respective loads 60 and 62 back to terminal 64, and thence into sub-winding 48—in this way completing the circuit.

The direction of current flow through loads 60 and 62 is such as to make terminals 56 and 58 positive, as indicated by the plus signs in the diamonds; and to make terminal 64 negative, as indicated by the negative sign in the diamond. Thus, terminals 56 and 64 form a second port, while terminals 58 and 64 form a third port. These second and third ports form one of the pairs of ports previously discussed.

In sub-transformer 20, the current flowing through sub-winding 46 produces in core 38, a magnetic field that tends to cause a current to flow through sub-winding 36 in the direction indicated by the dotted arrows.

Similarly, in sub-transformer 22, the current flowing through sub-winding 54 produces in core 42 a magnetic field that tends to cause a current to flow through sub-winding 40 in the direction indicated by its dotted arrows.

A study of the current flow through sub-windings 36 and 40 will indicate that equal and oppositely-directed currents are produced; tending to flow in the opposite directions indicated by the dotted arrows. Therefore no output signal is produced between or across terminals 66 and 68 in response to the input applied across terminals 26 and 28, as indicated by the zero signs in the diamonds. Thus, terminals 66 and 68 form the fourth port of the transformer, and co-act with the first port (terminals 26 and 28) to act as a pair of ports.

In summary, an input signal applied across terminals 26 and 28 (port one) produces identical output positive signals at terminals 56 and 58 (paired ports two and three), and does not produce any output (crosstalk) across terminals 66 and 68 (port four).

Example II

Figure 3:
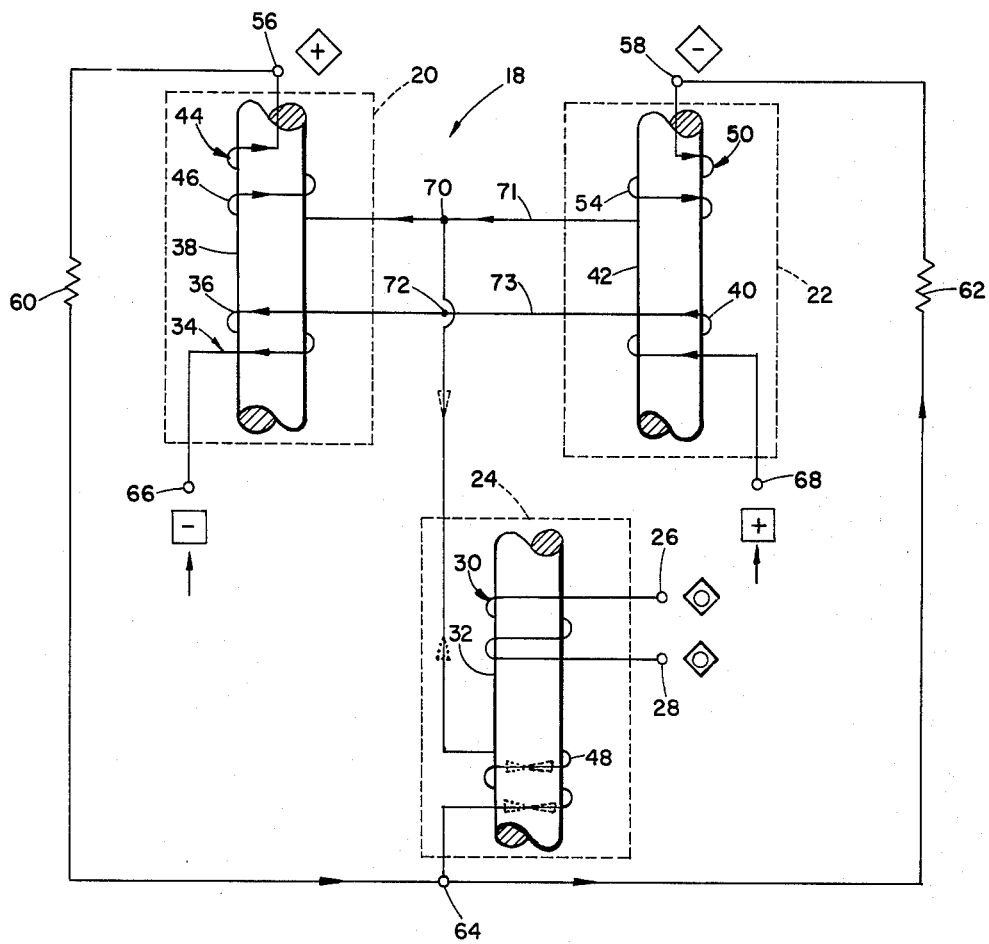

Referring now to FIG. 3, there is shown an illustration of the effects of a single input signal applied to terminals 66 and 68 (port four) of the device of FIG. 2. If the applied input signal has the instantaneous polarity indicated by the positive and negative sign in the squares adjacent terminals 66 and 68, a current flows through sub-windings 40 and 36 in the directions shown by their associated arrows. These currents induce a magnetic field in cores 38 and 42; the resultant magnetic fields producing current flow through sub-windings 46 and 54 as shown by their associated arrows.

It will be seen that in sub-winding 46 the current flows upwards to terminal 56, thence through load 60 and terminal 64; and—as shown by the dotted arrows, tends to flow through winding 48 and upwards back to sub-winding 46. Thus, as far as load 60 is concerned, the direction of current flow is such as to make terminal 56 appear to be positive, as shown by the plus sign in the diamond.

Current flow through sub-winding 54, however, is in such a manner that it tends—as shown by the dashed arrows—to flow downward, through sub-winding 48 and terminal 64, through load 62, and through terminal 58 to complete the circuit.

As far as load 62 is concerned, terminal 58 is the negative terminal, as indicated by the minus sign in the diamond.

Furthermore, the currents from sub-windings 46 and 54 flow in opposite directions through subcoil 48, and thus negate each other's effects. Therefore no magnetic field is produced in core 32, and no output signal appears at terminals 26 and 28, as shown by the zeros in the diamonds.

To summarize, a signal applied to terminals 66 and 68 (port four) does not produce any output (crosstalk) at terminals 26 and 28 (port one); produces a positive output put terminal 56 relative to terminal 64 (port two), and produces a negative output a teminal 58 relative to terminal 64 (port three).

Example III

Figure 4:
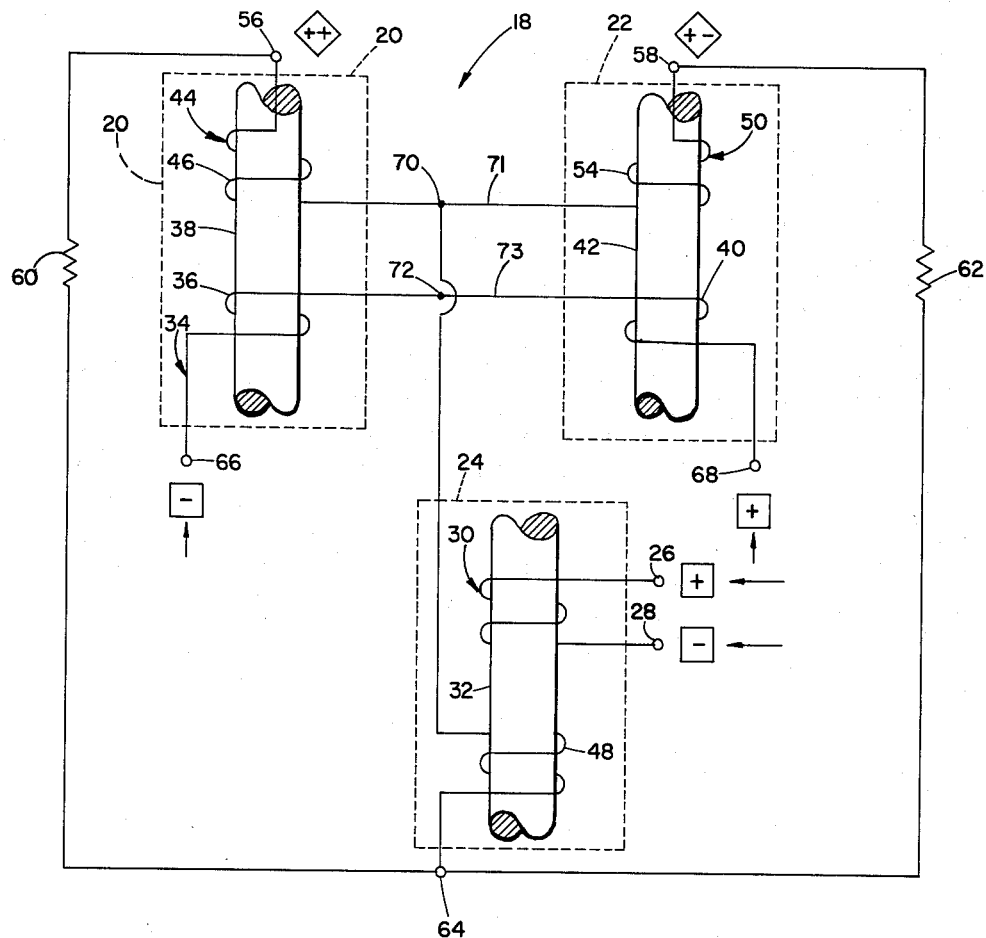

FIG. 4 indicates the combined effect produced upon the device of FIG. 2 by simultaneous input signals; a first input signal being applied across terminals 26 and 28, and a second input signal being applied across terminals 66 and 68, as described in connection with FIGS. 2 and 3, respectively. An analysis similar to that used above indicates that at terminal 56 relative to terminal 64 the sum of the two input signals is produced, as shown by the two plus signs in the diamond; while at terminal 58 relative to 64 the difference between the two input signals is produced, as shown by the plus and the minus sign in the diamond. At the same time, neither input signal affects the other; that is there is no crosstalk between the input signals.

It will thus be seen that the invention automatically provides sum and difference output signals for two separate input signals.

Tests have shown that if the input signals are identical, the output signals will be a highly-balanced sum and difference signal; that is, the sum will equal twice either input signal, and the difference will be equal to zero. Similarly, if the input signals are different, the output signals are the algebraic sum and difference of the instantaneous input signals.

Symmetry and balance considerations

It will be noted from FIGS. 2, 3, and 4 that sub-transformers 20 and 22, and their corresponding sub-windings are perfectly symmetrical "mirror images" of each other. For example, sub-winding 46 is a "right-hand" winding—that is, the wire curves like a right-hand thread; whereas corresponding sub-winding 54 is a "left-hand" winding. Similarly sub-winding 36 is a right-hand winding, whereas corresponding sub-winding 40 is a left-hand winding.

Furthermore, the number of turns is equal in corresponding sub-windings. The upper wires of sub-windings 46 and 54 are progressively and symmetrically spaced from the lower wires, and from point 70. Similarly, the lower wires of sub-windings 36 and 40 are progressively and symmetrically spaced from the upper wires, and from point 72. Thus, the relative spacing of corresponding sub-windings is the same.

This means that there are substantially identical symmetrical electrostatic fields at each sub-transformer, and that their leakage capacitances are the same. They therefore produce highly-balanced output signals whose balance is better by 20 to 40 decibels than that obtained by prior-art devices.

Moreover, since all portions of wire 71 have the same potential as point 70; and all portions of wire 73 have the same potential and point 72, this means that each sub-transformer 20 and 22 "sees" the same external condition.

The disclosed transformer permits the invention to be used for producing highly-balanced signals ranging from about 1 megacycle to 300 megacycles; and in particular to be useful in the 30 to 90 megacycle range that was previously unavailable for sum and difference signals.

In the disclosed transformer, it is not necessary that there be any magnetic interaction between sub-transformers 20 and 22. To minimize the effects of magnetic interaction, however, the sub-transformers 20 and 22 may be separated by a distance that is slightly larger than the diameter of the cores themselves. Under this condition it is unnecessary that these sub-transformers be placed perpendicular to each other, or in separate compartments; although a separating wall may be desirable in order to furnish a base upon which terminals for connecting the various lead-wires may be attached, or for additional isolation when exceptionally large-amplitude input signals are used.

Due to the symmetry of sub-transformers 20 and 22, if they should be placed close together, the magnetic effect of each will affect the other in exactly the same way; so that the symmetry will be maintained, and highly-balanced output signals will be produced.

Since again, there is no necessity for magnetic interaction between sub-transformer 24 and any of the other two sub-transformers, sub-transformer 24 may be positioned at any convenient location. If however it is unduly near the other sub-transformers, a physically symmetrical arrangement is preferred.

It is of course desirable that the sub-transformers 20 and 22 be as close to identical as possible, but sometimes this result is difficult to achieve in actual manufacturing. As a result the inherent spacing, interaction, etc., between the sub-windings on one core may be such that one sub-transformer produces a slightly higher output signal than the other. The invention has the inherent advantage that each sub-transformer may be adjusted independently of the other, without in any way affecting the other sub-transformers.

For example, suppose that due to manufacturing tolerances the sub-windings on one sub-transformer are slightly closer together than the sub-windings of the other sub-transformer—or that a sub-winding on one core may have a fraction of a turn more than a sub-winding on another core.

In accordance with the invention, each sub-transformer has a well-known "tuning slug" positioned within the core, and capable of longitudinal motion therein. If it is found that one sub-transformer produces a slightly larger output signal than the other, the tuning slug can be backed-off in such a way that the interaction between the sub-windings of that particular sub-transformer becomes less efficient, and therefore produces a somewhat smaller output signal. Conversely should the windings of one sub-transformer be such as to produce a somewhat smaller output signal than the other sub-transformer, the tuning slug may be repositioned, so that the interactions are somewhat more efficient, and thus increase the output signal.

Thus, each sub-transformer may be independently adjusted for optimum conditions, without however affecting the output of other. In this way minor imperfections of the individual sub-transformers can be compensated to produce an overall balanced transformer whose sum and difference output signals remain highly-balanced for a given frequency of input signal.

Figure 5:
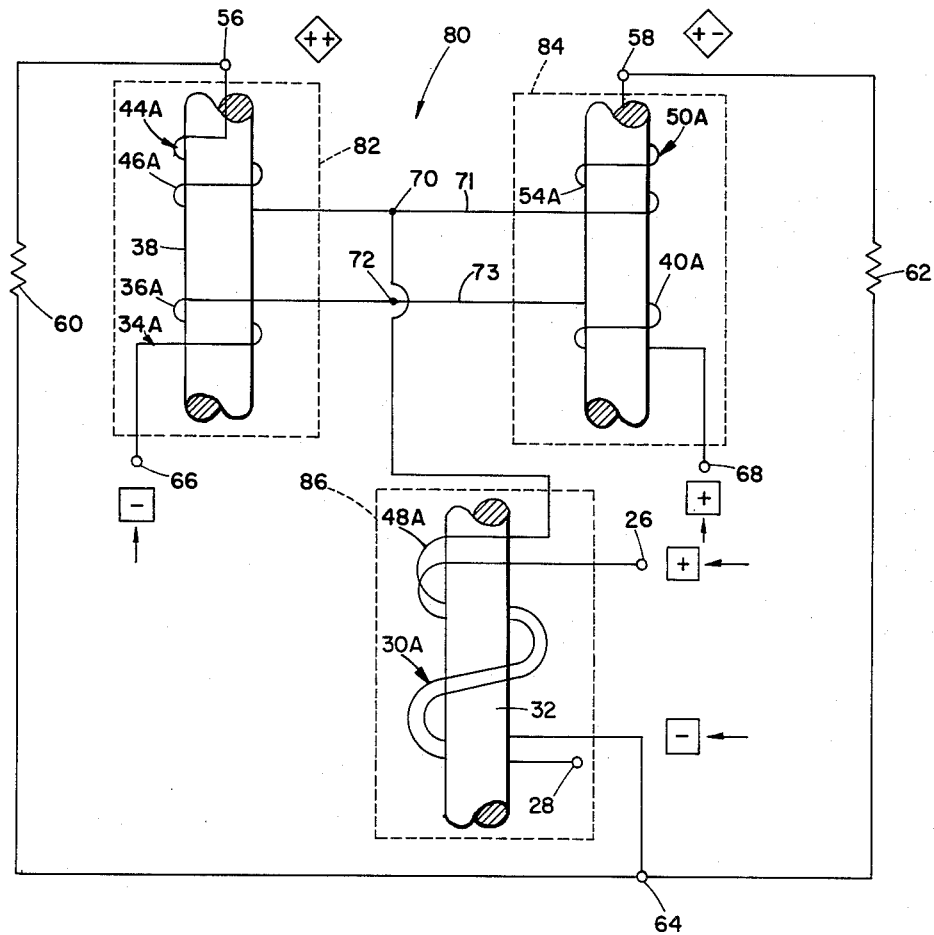
FIG. 5 shows another embodiment of the disclosed transformer.

FIG. 5 shows another embodiment of the novel transformer, this embodiment 80 differing from the previously-described one in that the upper sub-transformers 82 and 84 are no longer mirror images, but instead are identical. (This has some manufacturing advantages.) For example, it will be seen in sub-transformer 82, the sub-windings 36A and 46A are both right-hand windings; and that in sub-transformer 84, the corresponding sub-windings 40A and 54A are also right-hand windings.

It will be seen, however, that the sub-transformers are symmetrical, and that the potentials at points 70 and 72 have the same relation as previously discussed. Therefore the overall transformer 80 is balanced, and produces the highly-balanced sum and difference output signals for a given frequency of the input signal.

In FIG. 5, the third sub-transformer 86 is also slightly different, in that the sub-windings 30A and 48A are now "interleaved"; a situation described in the art as a "bifilar winding." This bifilar winding operates in the same manner as previously described, except that there is a slightly higher magnetic and capacitive interaction between the two windings.

If the input signals are of relatively low frequency, the capacitive interaction is of minor effect, while the higher magnetic interaction is an advantage. If however the input signals have a relatively high frequency, the higher capacitive interaction tends to be a disadvantage; and the separated windings of FIGS. 2, 3 and 4 may be preferable.

Figure 6:
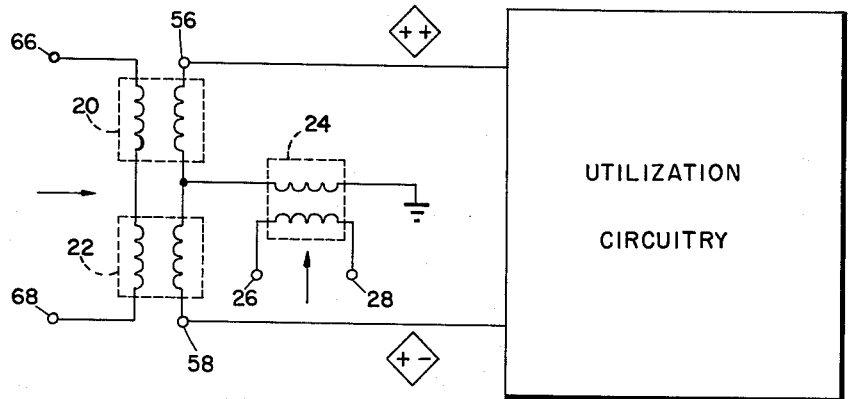
FIGS. 6 and 7 show circuitry using the disclosed transformer.

FIG. 6 shows a schematic diagram of a circuit using the novel transformer. One input signal is applied to terminals 66 and 68; and a second input signal is applied to terminals 26 and 28, as previously described. The sum and difference signals appear at terminals 56 and 58, and are then applied to suitable utilization circuitry, such as radar circuitry that uses sum and difference signals.

Alternatively, the entire disclosed transformer may be used as the transformer of a product detector, such as a balanced modulator, a frequency modulation detector, a phase-shift discriminator, a ratio detector, or the like.

Figure 7:
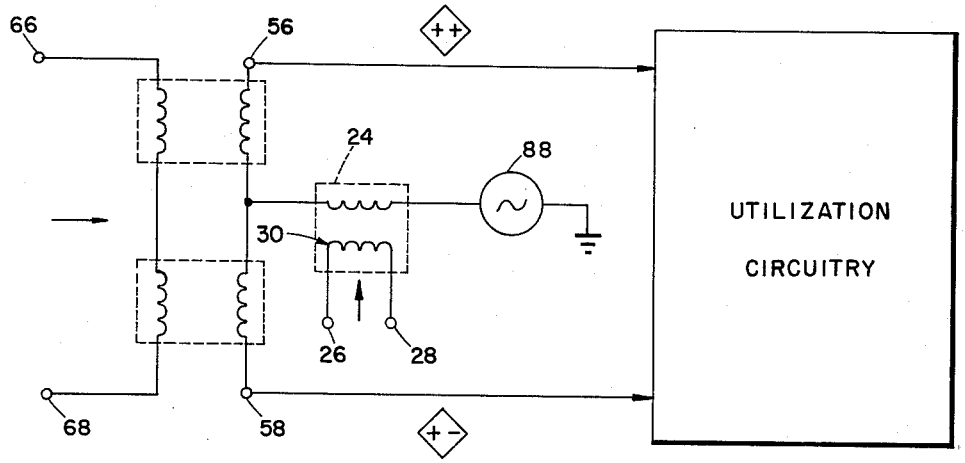

The schematic diagram of FIG. 7 shows how a third input signal may be incorporated into the novel transformer. A symbolically-shown signal generator 88 produces a signal that is fed into sub-transformer 24 just as though it had originated in winding 30.

As a result, the transformer receives a first unitary input signal that is applied to terminals 66 and 68; and receives a second, composite, input signal that is a combination of the signals produced by winding 30 and signal generator 88.

In accordance with previously-described principles, the transformer produces two highly-balanced sum and difference output signals; but in this case the output signal at terminal 56 is the sum of the unitary and the composite signals, whereas the output at terminal 58 is the difference between the unitary and the composite input signals.

The novel transformer as thus far described, has the ability to receive one or more separate input signals, and to produce two separate output signals; of which one output signal is the sum of the input signals, while the other output signal is the difference between the input signals.

The disclosed transformer has the novel characteristic that when used "backwards," it produces somewhat different results. This backward usage is shown in FIG. 8.

Here two input signals are applied across terminals 56 and 64 and across 58 and 64 respectively. If the two input signals are truly balanced and indentical, the output across terminals 26 and 28 will be the sum of the two input signals, namely an output signal that is twice as large as the input signals. Terminals 66 and 68 will produce an output signal that is the difference (zero) between the two balanced and identical signals.

Figure 8:
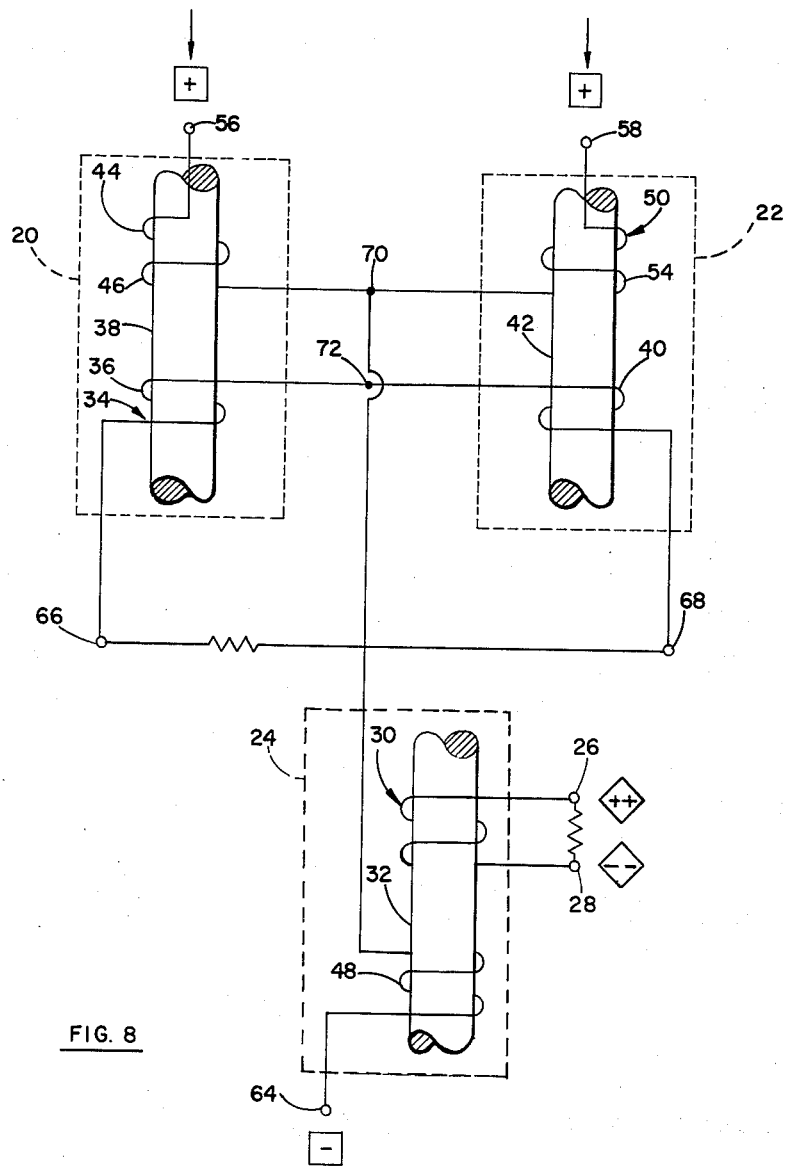
FIG. 8 shows the disclosed transformer used with still other input signals.

However in the configuration shown in FIG. 8, if the input signals applied to terminals 56 and 58 differ from each other in any way at all, the output signal across terminals 66 and 68 will increase from zero to indicate the difference; whereas the output signal at terminals 26 and 28 will continue to indicate the sum of the input signals.

This configuration allows the disclosed transformer to be used as a device for indicating by how much two input signals differ from each other.

Figure 9:
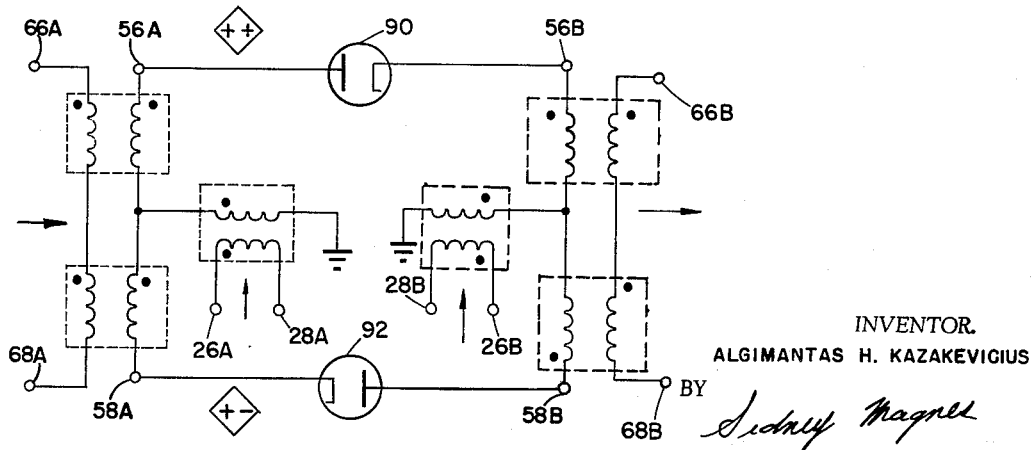
FIG. 9 shows still another circuit using two of the disclosed transformers in somewhat different manners.

FIG. 9 shows a schematic circuit illustrating both uses of the disclosed transformer. Starting at the left, a first input signal is applied to terminals 66A and 68A, and a second input signal is applied to terminals 26A and 28A. In accordance with previously-described operation of the transformer, terminal 56A produces an output signal that is the sum of the input signals; whereas terminal 58A produces an output signal that is the difference between the input signals. These sum and difference signals are passed through suitable non-linear devices 90 and 92, such as diodes. The output of devices 90 and 92 is then applied to terminals 56B and 58B of the backwards usage, and a third input modulating, signal is applied to terminals 26B and 28B. The overall operation of the circuit of FIG. 9 is such as to multiply together the three input signals.

If the input signals were originally identical, the output from terminal 56A would be twice the input signal, while the output from terminal 58A would be zero (the difference between two identical values). The resultant signal (twice the input signal minus zero), is applied to terminals 56B and 58B, and will produce an output signal across terminals 66B and 68B, thus showing that the original signals were identical.

If however the original signals were not identical, the output signal at terminal 56A would be the sum of the two input signals (smaller than if the two input signals were equal), while the output signal at terminal 58A would be larger than zero (since it is now the difference between two unequal signals). The resultant signal will therefore be smaller than in the first case, and the output signal at terminals 66B and 68B will indicate that the original input signals were not identical.

The present trend toward miniaturizing and lightening electronic circuits has resulted in a concept known as a "printed-wiring board." This board comprises a sheet of insulative material having on its surface a pattern of conductive material, which may take the form of lines to act as wires. A printed-wire transformer takes the form of two concentric spirals, wherein each spiral acts as a winding. In this case a separate form or core is unnecessary, and comprises the center of the two concentric spirals.

Figure 10:
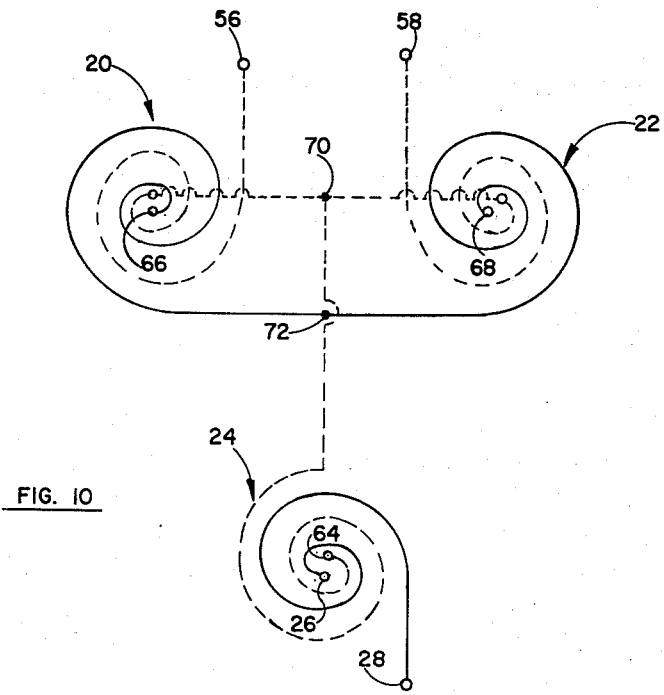
FIGS. 10 and 11 show the disclosed transformer in a printed-wire configuration.

FIG. 10 shows the disclosed transformer as a printed-wire configuration. The pairs of concentric spirals form the individual sub-transformers 20, 22, and 24; and the dotted-line connections are on the back surface of the printed-wire board to provide crossovers between the various printed-wire lines. The sub-transformers and the terminals have been positioned, for clarity, in the same relative positions as the preceding illustrations; although the above-described symmetry and spacing should be observed.

Figure 11:
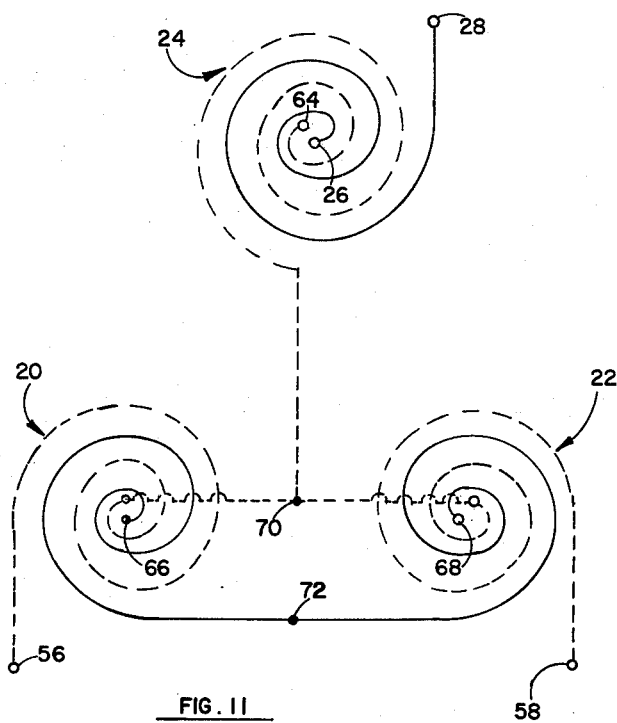

FIG. 11 shows another printed-wire configuration of the disclosed transformer, this configuration being rearranged to minimize the problem of wire crossover.

A complete printed-wire transformer of the configurations of FIGS. 10 and 11 will fit on a square printed-wire board that measures ¾ of an inch along each side.

The disclosed device is capable of handling signals from about 1 megacycle to about 300 megacycles per second; and is a compact, passive arrangement that requires very little space, and is quite lightweight.

One embodiment produces sum and difference signals that are widely used in radar and other circuitry. Another embodiment produces modulated sum and difference signals; while a third arrangement produces an output signal indicative of the difference between the input signals.

Although the invention has been described and illustrated in detail, it is to be clearly understood that the same is by way of illustration and example only, and is not to be taken by way of limitation; the spirit and scope of this invention being limited only by the terms of the appended claims.

I claim:
1. A four-port hybrid impedance network for providing a first and second balanced output indicative of the sum and difference respectively of a first and second input having a frequency as high as 60 megacycles per second comprising:
 a first winding having first and second sub-windings;
 a second winding having third and fourth sub-windings;
 a third winding having fifth and sixth sub-windings;
 and a fourth winding;
 said second sub-winding and fourth sub-windings being comprised of a common sub-winding,
 said windings being arranged as transformers,
  a first transformer comprising said first and fifth sub-windings,
  a second transformer comprising said third and sixth sub-windings, and
  a third transformer comprising said fourth wind- and said common sub-winding,
  the windings on each said first and second transformer being oppositely wound and said first and second transformers being mutually parallel and spaced in a mutually side-by-side relationship and in a symmetrically-spaced relationship to said third transformer, said first and third windings being mutually oppositely wound,
  said transformers being interconnected to comprise a four-port hybrid impedance.

2. The device of claim 1, including a terminal of said common sub-winding being commonly connected to a first terminal of each of said first and third sub-windings by means of a common terminal, and
 said first and second transformers being mutually spaced and said common terminal centrally located whereby the symmetry of the distributed capacitance between corresponding terminals of said first and second transformers is improved.

References Cited by the Examiner

UNITED STATES PATENTS

| | | | |
|---|---|---|---|
| 1,624,498 | 4/1927 | Mohr | 332—43 X |
| 2,402,599 | 10/1942 | Charchian | 336—81 |

HERMAN KARL SAALBACH, *Primary Examiner.*

M. L. NUSSBAUM, *Assistant Examiner.*